Figure 1:
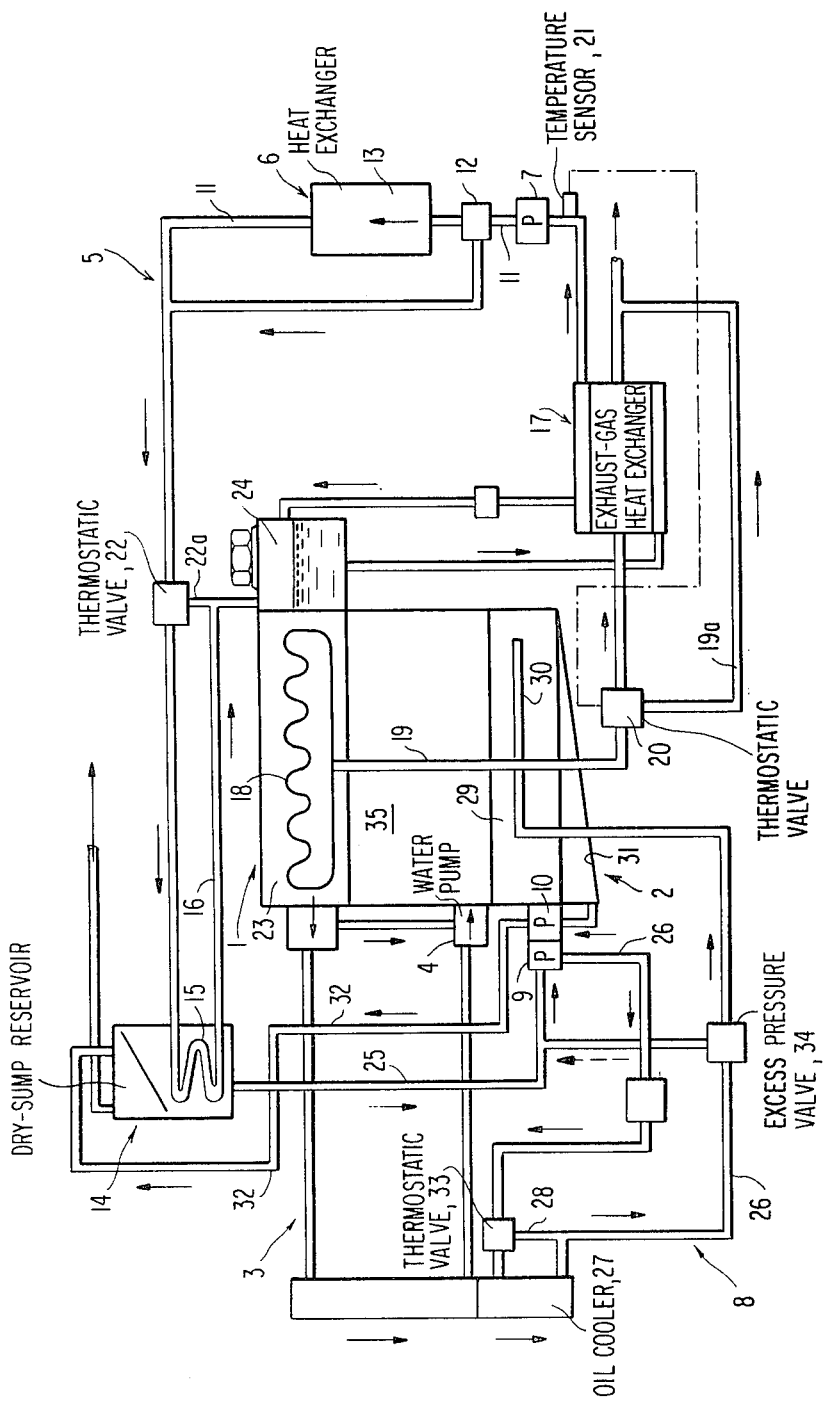

United States Patent [19]

Lamm

[11] 4,258,676
[45] Mar. 31, 1981

[54] HEATING SYSTEM PRODUCING WARM AIR FOR MOTOR VEHICLES DRIVEN BY AN INTERNAL COMBUSTION ENGINE

[75] Inventor: Heinz Lamm, Esslingen-St. Bernhardt, Fed. Rep. of Germany

[73] Assignee: Daimler-Benz Aktiengesellschaft, Stuttgart, Fed. Rep. of Germany

[21] Appl. No.: 964,168

[22] Filed: Nov. 28, 1978

[30] Foreign Application Priority Data

Dec. 2, 1977 [DE] Fed. Rep. of Germany ....... 2753716

[51] Int. Cl.³ .............................................. F02N 17/02
[52] U.S. Cl. ...................... 123/142.5 R; 123/196 AB; 123/556
[58] Field of Search ............ 123/142.5, 122 D, 122 R, 123/196 AB; 184/6.22

[56] References Cited

U.S. PATENT DOCUMENTS

| | | | |
|---|---|---|---|
| 1,377,606 | 5/1921 | Swan | 123/122 D |
| 1,581,761 | 4/1926 | Muir | 123/142.5 R |
| 1,904,429 | 4/1933 | Evans | 123/122 D |
| 2,133,514 | 10/1938 | Holmes | 123/142.5 R |
| 2,136,040 | 11/1938 | Clarke | 123/142.5 R |
| 3,134,374 | 5/1964 | Stevens | 123/142.5 R |

Primary Examiner—Ronald H. Lazarus
Attorney, Agent, or Firm—Craig and Antonelli

[57] ABSTRACT

A warm-air heating system for motor vehicles driven by an internal combustion engine, which is equipped with a heat-exchanger adapted to be acted upon by atmospheric air for the transfer of heat from a heat carrier that circulates in a line circulatory system, and with a heat-exchanger also interconnected in the line circulatory system which absorbs exhaust gas heat of the internal combustion engine and gives off the heat to the heat carrier; the line circulatory system for the heat carrier of the heating system is thereby in heat-transferring connection at least with the lubricating oil circulatory system of the internal combustion engine.

14 Claims, 2 Drawing Figures

HEATING SYSTEM PRODUCING WARM AIR FOR MOTOR VEHICLES DRIVEN BY AN INTERNAL COMBUSTION ENGINE

The present invention relates to a heating installation producing heated air for motor vehicles driven by an internal combustion engine, with a heat-exchanger adapted to be acted upon by atmospheric air for the heat transmission of a heat carrier flowing in a line circulatory system and with a heat-exchanger also interconnected into the line circulatory system which absorbs exhaust gas heat of the internal combustion engine and transfers the same to the heat carrier.

In motor vehicles with such types of heating installations influenced by exhaust-gas heat, it is known in the prior art that the line system for the heat transfer medium is connected to the cooling circulatory system of the water-cooled internal combustion engine, whereby the cooling water warmed-up or heated by the internal combustion engine flows through the heat-exchanger acted upon by the exhaust gases and then flows back into the cooling circulatory system by way of the second heat-exchanger of the heating installation.

However, these measures effect considerable temperature differences between the parts of the internal combustion engine, whose cooling spaces are traversed by cooling water, and such parts of the internal combustion engine which are in contact with the lubricating oil.

Furthermore, disadvantages result from the costly, large line network since a completely satisfactory filling and venting of this line network is connected with difficulties.

The present invention is now concerned with the task to eliminate the aforementioned disadvantages by simple measures.

The underlying problems are solved according to the present invention in that the line circulatory system for the heat carrier of the heating installation is in heat-transferring connection at least with the lubricating oil circulatory system of the internal combustion engine.

As known, the cooling water temperatures of customary internal combustion engines are higher at partial load and during winter operation than the lubricating oil temperatures. As a result of the measures according to the present invention, the temperature level of the lubricating oil is raised and lies at least also as high as that of the cooling water.

In an advantageous construction of the present invention, provision is made for motor vehicles equipped with an internal combustion engine having a dry sump lubrication, that the line circulatory system for the heat carrier of the heating installation is in heat-transferring connection with the dry sump reservoir or container of the dry sump lubrication by means of a heat-exchanger.

Since hot exhaust gases are available immediately after the starting of the internal combustion engine, even with particularly low outside temperatures, a rapid warm-up of the heat carrier in the line circulatory system of the heating installation is possible which upon reaching a predetermined temperature, for example, of 60° to 80° C., is supplied to the heat-exchanger in operative connection with the dry sump container. Heat is given off thereat to the lubricating oil of the internal combustion engine.

In addition to the warm-up of the lubricating oil, a further advantage additionally resides in the fact that also a positive influence on the warm-up of the cooling water is exerted since also the crankcase is heated-up more rapidly.

For an intensive heat-exchange, it is additionally proposed to integrate the heat-exchanger into the dry sump container.

For the further enhancement of the lubricating oil warm-up, provision is made in motor vehicles with a lubricating oil circulatory system, into which is interconnected an oil suction pump returning the lubricating oil to the dry sump reservoir, that the return flow of the lubricating oil takes place through the crankcase of the internal combustion engine.

Since oil now flows through the cooling spaces of the crankcase, the water circulatory system can be dispensed with within this area, which now only has the task to cool the cylinder head. The advantages thereof are, inter alia, very small water volumes and improved cylinder head through-flow as a result of smaller flow resistances, and additionally no heat transfer or yield to the heating system. The oil will always be kept at a higher temperature also at extremely low outside temperatures.

Accordingly, it is an object of the present invention to provide a warm air heating installation for motor vehicles driven by an internal combustion engine which avoids by simple means the aforementioned shortcomings and drawbacks encountered in the prior art.

Another object of the present invention resides in a warm-air heating system for motor vehicles driven by an internal combustion engine, in which considerable temperature differences between parts of the internal combustion engine in contact with the cooling water and those in contact with the lubricating oil are effectively minimized.

A further object of the present invention resides in a warm-air heating system for motor vehicles driven by an internal combustion engine, which facilitates the filling and venting of the line network of the system while at the same time raising the temperature level of the lubricating oil to at least that of the cooling water.

Still a further object of the present invention resides in a warm-air heating installation for a motor vehicle driven by an internal combustion engine, which assures a rapid heat-up of the heat carrier of the heating installation while permitting a positive influence on the heating-up of the cooling water.

Still another object of the present invention resides in a heating system of the aforementioned type which is simple in construction and highly reliable in operation yet involves a relatively smaller water volume and improved cylinder head cooling due to smaller flow resistances.

Figure 2:
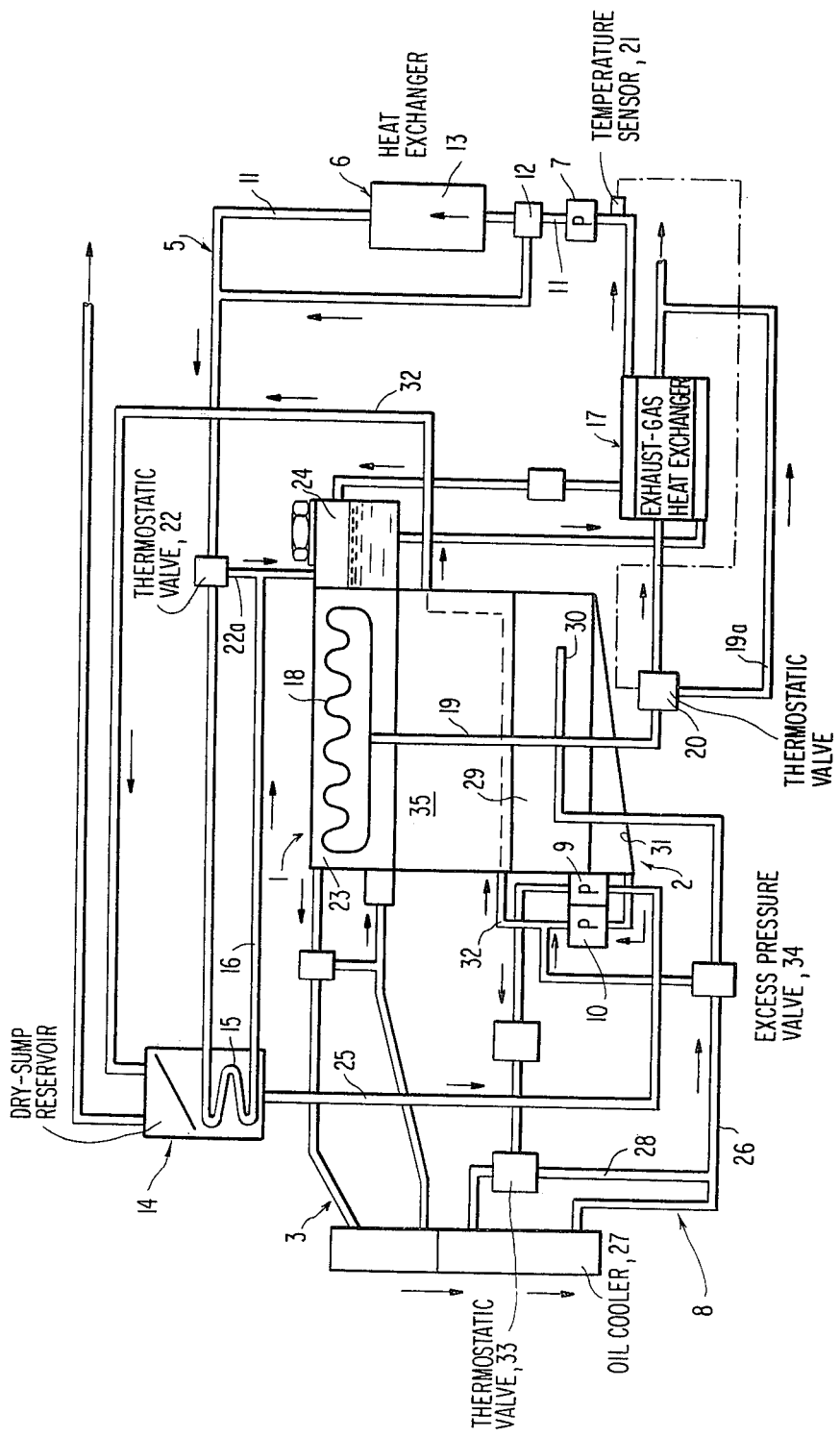

These and further objects, features and advantages of the present invention will become more apparent from the following description when taken in connection with the accompanying drawing which shows, for purposes of illustration only, two embodiments in accordance with the present invention, and wherein:

FIG. 1 is a schematic view of a heating installation in accordance with the present invention for a motor vehicle driven by an internal combustion engine and illustrating the entire line network which includes the heating circulatory system for the heating installation and the lubricating oil circulatory system for the internal combustion engine; and FIG. 2 is a schematic view, similar to FIG. 1, of a modified embodiment of a heating installation in accordance with the present invention, in which the crankcase is included in the lubricating oil circulatory system.

Referring now to the drawing wherein like reference numerals are used throughout the two views to designate like parts, an internal combustion engine generally designated by reference numeral 1, equipped with a dry sump lubricating system generally designated by reference numeral 2, simultaneously drives a water pump 4, interconnected in a line circulatory system generally designated by reference numeral 3 for the cooling water, a circulating pump 7, connected in a heating line circulatory system generally designated by reference numeral 5 for the heat carrier of a heating installation generally designated by reference numeral 6, a pressure pump 9, and a return pump 10 interconnected in a line circulatory system generally designated by reference numeral 8 for the lubricating oil. The circulating pump 7 for the heating system, however, may also be driven electrically.

The line circulatory systems 3, 5 and 8 are separate from one another but are in heat-transferring connection with each other.

A regulating device 12 of any conventional construction is interconnected in the line circulatory system 5 for the heat carrier of the heating installation in the inlet line 11 thereof downstream of the circulating pump 7, as viewed in the flow direction. Additionally, a heat-exchanger 13, which is provided for the heating of atmospheric air that can flow through the passenger space of the motor vehicle (not shown), and a heat-exchanger 15, indicated as pipe coil in a dry sump reservoir generally designated by reference numeral 14 of the dry sump lubrication, by way of which heat is given off to the lubricating oil circulatory system 8, are interconnected in the line circulatory system 5 downstream of the regulating device 12. A return line 16 leads from the heat-exchanger 15 to an exhaust-gas heat-exchanger 17, to which is connected the inlet line 11.

The exhaust-gas heat-exchanger 17 is interconnected in an exhaust-gas line 19 fed by the exhaust gases by way of an exhaust-gas mainfold 18 and can be by-passed by a by-pass line 19a by means of a thermostatic valve 20. This thermostatic valve 20 cooperates with a temperature sensor 21 arranged in the inlet line 11, which prevents the heat carrier supplying the heat-exchanger 13 from exceeding a predetermined operating temperature.

A heat transfer to the lubricating oil in the dry sump reservoir 14 by the heat carrier flowing in the inlet line 11 can be interrupted by a thermostatic valve 22, by means of which the heat carrier is conducted from the inlet line 11 in by-passing relationship to the heat-exchanger 15 directly into the return line 16 by way of a by-pass line 22a.

Additionally, a container or reservoir 24 for the venting and refilling can additionally be interconnected in the return line 16 downstream of the by-pass line 22a terminating in the return line 16, as viewed in the flow direction, whereby the reservoir or container 24 which is secured to the cylinder head 23 of the internal combustion engine 1, may be interconnected at the same time as a heat-exchanger which thus gives off heat to the cooling spaces of the cylinder head 23 through which the cooling-water of the cooling-water circulatory system 3 flows.

The lubricating oil which is heated up within the dry sump reservoir 14 by the heat carrier of the heating line circulatory system 5, reaches the pressure pump 9 by way of an oil return line 25, by means of which the oil is forced into the oil inlet line 26 and is conducted by way of a line 28 by-passing the oil cooler or oil radiator 27 into a main oil channel 30 disposed in the crankcase 29 of the internal combustion engine 1. Oil dripping into a suction trough 31 is sucked off by the return pump 10 and is pumped into an oil pressure line 32 to the dry sump reservoir 14.

The lubricating oil is conducted only by way of an oil cooler or oil radiator 27, when the temperature lies significantly above the temperature of the cooling water. The regulation takes place by a thermostatic valve 33. An excess pressure valve 34 is additionally interconnected in the oil inlet line 26 which in case of an excessive oil pressure permits the oil to flow off into the pressure line 32.

As a result of the measures according to the present invention, not only the warm-up phase is shortened but additionally also the engine is driven with a higher heated oil temperature, for example, of 100° C. at smaller loads and during winter operation. As a result of higher operating temperatures, drag power (friction), fuel consumption and exhaust gas emissions are reduced.

The embodiment illustrated in FIG. 2 differs from the embodiment illustrated in FIG. 1 as described hereinabove, only in that, for a further enhancement of the engine oil warm-up, the crankcase 35 is acted upon with returned or fed-back pressure oil of the dry sump lubrication. Thus, the oil supplied by the return pump 10 does not flow directly into the dry sump reservoir 14 but flows beforehand through the cooling spaces in the crankcase 35.

Consequently, the crankcase 35 is no longer included in the cooling water circulatory system but only the cylinder head 23 is now still included in the cooling-water circulatory system.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A warm-air heating installation for a motor vehicle driven by an internal combustion engine having a line circulatory means through which a heat carrier flows, and a lubricating oil circulatory means, the heating installation comprising a first heat-exchange means adapted to be acted upon by atmospheric air for effecting a heat transfer from the heat carrier flowing within the line circulatory means, and a second heat-exchanger means operatively connected in the line circulatory means for absorbing exhaust gas heat of the internal combustion engine and for transferring exhaust gas heat to the heat carrier, characterized in that means are provided for establishing a heat-transferring connection at least between the lubricating oil circulatory means of the internal combustion engine and the line circulatory means.

2. A heating installation to claim 1, wherein the lubricating oil circulatory system comprises a dry sump lubrication including a dry sump reservoir means, characterized in that the means for establishing heat-transferring connection includes a third heat exchanger means adapted to establish the heat transferring connection between the line circulatory means and the dry sump reservoir means.

3. A heating installation according to claim 2, characterized in that the third heat-exchanger means is adapted to be integrated into the dry sump reservoir means.

4. A heating installation according to claim 2, wherein the lubricating oil circulatory means includes an engine crankcase into which is interconnected an oil suction pump means for feeding back the lubricating oil to the dry sump reservoir means, characterized in that means are provided for enabling a return-feed of lubricating oil by the oil suction pump through the engine crankcase so as to enhance a warm-up of the lubricating oil.

5. A heating installation according to claim 3 or 4, characterized in that said heat-exchanger means are connected in series with each other in the line circulatory means, and in that the line circulatory means is separate from a cooling-water circulatory means for at least the cylinder head of the engine.

6. A heating installation according to claim 5, characterized in that all circulatory means are separate from each other but in mutual heat-transfer relationship.

7. A heating installation according to claim 6, characterized in that the line circulatory means includes a line extending from the heat-transfer connection formed by the third heat-exchanger means toward the second heat-exchanger means, and in that a further reservoir means is disposed in said line.

8. A heating installation according to claim 7, characterized in that the further reservoir means is operable as heat-exchanger means between the heat carrier and cooling water of the cooling-water circulatory means.

9. A heating installation according to claim 4, characterized in that the third heat-exchanger means is adapted to be integrated into the dry sump reservoir means.

10. A heating installation according to claim 1, characterized in that said heat-exchanger means are connected in series with each other in the line circulatory means, and in that the line circulatory means is separate from a cooling-water circulatory means for at least the cylinder head of the engine.

11. A heating installation according to claim 10, characterized in that all circulatory means are separate from each other but in mutual heat-transfer relationship.

12. A heating installation according to claim 11, characterized in that the line circulatory means includes a line extending from the heat-transfer connection toward the second heat-exchanger means, and in that a further reservoir means is disposed in said line.

13. A heating installation according to claim 12, characterized in that the further reservoir means is operable as heat-exchanger means between the heat carrier and cooling water of the cooling-water circulatory means.

14. A heating installation according to claim 12 or 13, characterized in that said further reservoir means is constructed as a filling and venting reservoir.

* * * * *